UNITED STATES PATENT OFFICE.

WILLIAM H. TOWERS, OF BOSTON, MASSACHUSETTS, (ELLEN F. TOWERS, ADMINISTRATRIX.)

IMPROVEMENT IN COUGH CANDY OR SUGAR.

Specification forming part of Letters Patent No. 195,464, dated September 25, 1877; application filed September 22, 1876.

*To all whom it may concern:*

Be it known that I, WILLIAM H. TOWERS, of Boston, in the county of Suffolk and State of Massachusetts, have invented certain new and useful Improvements in Pharmaceutical Preparation; and I do hereby declare that the following is a full, clear, and exact description thereof, which will enable others skilled in the art to which it appertains to make and use the same.

The object of this invention is to prepare a pharmaceutical preparation combining all the valuable properties of flaxseed, lobelia, and sugar. Flaxseed in the form of extract is demulcent and emollient. *Lobelia inflata* is well known as a drug which contains quite a number of medical principles. As usually prepared in the form of tincture or fluid extract with sirup, it is too acrid for general use. By combining it with mucilage said properties of the flaxseed, together with my sugar or candy to dilute and fix all the elements, I have produced a new and valuable cough sugar or candy.

The following description will enable others to make my compound.

I take of extract or infusion of flaxseed and add to it one-third of its volume of the tincture of lobelia of the efficient strength, United States Dispensatory. I then take a quantity of dry sugar sufficient to make the amount of the medicine required and saturate it with the mixture of flaxseed and lobelia above described. The sugar is then dried and put up in packages ready for use.

After saturating the sugar containing the extracts, it may be melted so as to form a candy. Any suitable flavoring may be added in the form of essences usually employed by confectioners or druggists.

I have given what I regard as the best proportions; but I do not limit myself strictly to them, as they may be varied without departing from the nature of my invention.

The amount of flaxseed extract and sugar may be greatly increased without any danger from overdose; but the quantities of lobelia should not greatly exceed that given above. I have named the infusion of flaxseed and the tincture of lobelia; but any expectorant preparation may be used.

Having thus described my invention, what I claim, and desire to secure by Letters Patent of the United States, is—

The within-described pharmaceutical preparation composed of flaxseed, lobelia, and a saccharine substance, substantially as set forth.

In testimony that I claim the foregoing as my own I affix my signature in presence of two witnesses.

WM. H. TOWERS.

Witnesses:
J. L. NEWTON,
ELLEN F. TOWERS.